United States Patent
Lucente Stabile et al.

(10) Patent No.: US 12,537,664 B2
(45) Date of Patent: Jan. 27, 2026

(54) ENCRYPTION METHODS

(71) Applicants: Francesco Lucente Stabile, Peabody, MA (US); Carey Atkins, Hampstead, NC (US)

(72) Inventors: Francesco Lucente Stabile, Peabody, MA (US); Carey Atkins, Hampstead, NC (US)

( * ) Notice: Subject to any disclaimer, the term of this patent is extended or adjusted under 35 U.S.C. 154(b) by 0 days.

(21) Appl. No.: 18/138,092

(22) Filed: Apr. 23, 2023

(65) Prior Publication Data
US 2025/0141656 A1    May 1, 2025

(51) Int. Cl.
| | | |
|---|---|---|
| *H04L 9/06* | (2006.01) | |
| *G09C 1/00* | (2006.01) | |
| *H04L 9/00* | (2022.01) | |
| *H04L 9/08* | (2006.01) | |
| *H04L 9/40* | (2022.01) | |

(52) U.S. Cl.
CPC .............. *H04L 9/0618* (2013.01); *G09C 1/00* (2013.01); *H04L 9/00* (2013.01); *H04L 9/0838* (2013.01); *H04L 63/0435* (2013.01)

(58) Field of Classification Search
CPC ..... H04L 9/0618; H04L 63/0435; H04L 9/00; H04L 9/0838; G09C 1/00
See application file for complete search history.

(56) References Cited

U.S. PATENT DOCUMENTS

| | | | |
|---|---|---|---|
| 9,923,720 B2 * | 3/2018 | Garcia Morchon | .. H04L 9/3093 |
| 10,764,029 B1 * | 9/2020 | Atkins | .................. H04L 9/3066 |
| 2007/0214361 A1 * | 9/2007 | Rubin | ....................... H04L 9/06 |
| | | | 713/168 |
| 2009/0245515 A1 * | 10/2009 | Bond | ..................... H04L 9/302 |
| | | | 380/282 |

OTHER PUBLICATIONS

Arnold Schonhage, "Factorization of Univariate Integer Polynomials by Diophantine Approximation and an Improved Bases Reduction Algorithm", Jul. 16, 1984, Automata, Languages and Programming, Springer Berlin Heidelberg, Berlin, Heidelberg, pp. 436-447 (Year: 1984).*

Towa et al., Succinct Diophantine-Satisfiability Arguments, 2020, International Association for Cryptographic Research, pp. 784-804 (Year: 2020).*

Osipyan et al., Research and development of mathematical models of cryptosystems based on universal Diophantine language, 2022, EDP Science, pp. 1-10 (Year: 2022).*

* cited by examiner

*Primary Examiner* — Ellen Tran

(57) ABSTRACT

A method of symmetric encryption and transferring encrypted data is provided that incorporate the Lucente Stabile Atkins Cryptosystem ("DIO-LSA"). This method uses certain properties of mathematical objects called "groups," where groups are sets of elements that are equipped with an operator and have the closure, associativity, identity, and invertibility properties. The DIO-LSA uses groups to encrypt and decrypt any kind of information between two or more parties.

6 Claims, No Drawings

ENCRYPTION METHODS

RELATED APPLICATIONS

This application claims priority to U.S. Ser. No. 63/363,837 filed on Apr. 29, 2022, and is incorporated by reference in its entirety. This application is related to U.S. Pat. No. 10,764,029B1 filed on May 6, 2019, and is incorporated by reference in its entirety herein.

FIELD OF INVENTION

This disclosure is directed to methods for encryption.

BACKGROUND OF THE INVENTION

Encryption is the process of encoding information by converting the original representation of the information, known as plaintext, into an alternative form, known as ciphertext. Encryption can be used to protect information at rest, for example, on computers and storage devices, or in transit, for example, data being transferred via networks, mobile telephones, wireless devices, and financial devices such as an ATM machine. There are two main types of encryption methods, including symmetric and asymmetric. Symmetric encryption methods use a single key to encrypt and decrypt data. Asymmetric encryption methods use multiple keys, including a public key to encrypt information and a private key to decrypt the information. Current encryption methods are limited in that they rely on computational power for security, and therefore it is desirable to develop improved methods.

SUMMARY

According to an aspect of the invention, a method of encryption and transferring encrypted data comprises a) generating an encryption key represented by k>1, comprising the steps, (i) generating an integer n where the product of all the integers less than n and coprime with n is congruent to 1 mod n, wherein U(n) comprises $a_1 \cdot a_2 \cdot a_3 \cdots a_{\varphi(n)} \equiv 1$ mod n, (ii) listing the elements of U(n) in ascending order as $U(n) = <\in_1, \in_2, \in_3, \ldots, \in_h, \ldots, \in_{\varphi(n)}>$ wherein $\in_i < \in_j$ when i<j, and (iii) choosing an element from $\in_i < \in_j$ to represent a plaintext of a selection of data; b) encrypting the selection of data by (i) multiplying together each element of the group up to $\in_h$ modulo n in the following way: $\in_1 \cdot \in_2 \cdots \in_h$ mod n≡c, and (ii) generating a ciphertext, tuple $C=(z, \Sigma)$, wherein z is calculated by solving the Diophantine Equation for the unique positive value less than n, where the Diophantine Equation comprises $c \cdot z \equiv 1$ mod n, where such an inverse element is z, and wherein, for an integer r, cz−1=rn→cz−rn=1; c) sending $C=(z, \Sigma)$ to one or more third parties over a network; and d) decrypting, by the one or more third parties, the ciphertext using the encryption key. According to this aspect of the invention, decrypting can comprise receiving $C=(z, \Sigma)$ and multiplying the elements in ascending order until $\Sigma+1$ elements congruent to 1 modulo n, is found, revealing the plaintext.

According to an aspect of the invention, a method of encryption and transferring encrypted data comprises a) generating an encryption key represented by k>1, comprising the steps, (i) generating an integer n such that $n=p^t$ or $n=2p^t$ where the product of all the integers less than n and coprime with n is congruent to −1 mod n, wherein U(n) comprises $a_1 \cdot a_2 \cdot a_3 \cdots a_{\varphi(n)}$ mod n, (ii) listing the elements of U(n) in ascending order as $U(n) = <\in_1, \in_2, \in_3, \ldots, \in_h, \ldots, \in_{\varphi(n)}>$ wherein $\in_i < \in_j$ when i<j, and (iii) choosing an element from $\in_i < \in_j$ to represent a plaintext of a selection of data; b) encrypting the selection of data by (i) multiplying together each element of the group up to $\in_h$ modulo n in the following way: $\in_1 \cdot \in_2 \cdots \in_h$ mod n≡c, and (ii) generating a ciphertext, tuple $C=(z, \Sigma)$, wherein z is calculated by solving the Diophantine Equation for the unique positive value less than n, where the Diophantine Equation comprises $c \cdot z \equiv 1$ mod n, where such an inverse element is z, and wherein, for an integer r, cz+1=rn→cz−rn=−1; c) sending $C=(z, \Sigma)$ to one or more third parties over a network; and d) decrypting, by the one or more third parties, the ciphertext using the encryption key. According to this aspect of the invention, decrypting can comprise receiving $C=(z, \Sigma)$ and multiplying the elements in ascending order until $\Sigma+1$ elements congruent to −1 modulo n, is found, revealing the plaintext.

According to any of the above aspects of the invention, encrypting can comprise encrypting on an electronic device having at least one process and at least one memory.

According to any of the above aspects of the invention, the electronic device can be selected from the group consisting of: a desktop computer; a laptop computer; a smartphone; a tablet computer; and an automated teller machine.

According to an aspect of the invention, a method for enhancing keys can comprise any of the above aspects and can further comprise canonical multiplying each element of the group up to the plaintext h as h: $\epsilon 1, \epsilon 2 \cdots \epsilon h = M$, where M comprises the enhanced key.

DETAILED DESCRIPTION

The present invention comprises a symmetric encryption method that follows Kerckhoffs's principle, herein referred to as the Diophantine-Lucente Stabile Atkins Cryptosystem or DIO-LSA. The method uses certain properties of mathematical objects called "groups," where groups are sets of elements that are equipped with an operator and have the closure, associativity, identity, and inverse properties. A group can be cyclic or noncyclic and of any size. The DIO-LSA uses groups to encrypt and decrypt any kind of information between two or more parties. The U(n) group, which is the set of all the integers coprime to n and less then n, closed under multiplication modulo n, is used for its closure property. The closure property guarantees that whenever elements of the group are operated upon each other, the resulting element is itself a member of the group. This happens due to the existence of a unique element called the identity element. The identity element is an element e such that, for each element a of the group, ea=a(mod n) and ae≡a(mod n). Moreover, each element of a group has a unique inverse such that, for each element a in the group U(n) there exists an element b, where a operated with b generates the identity e, which in the case of a multiplicative groups means ab≡1(mod n).

The DIO-LSA provides improvements in speed, computation, and security as compared to LSA, where the LSA is described in U.S. Pat. No. 10,764,029B1 filed on May 6, 2019, which is incorporated by reference in its entirety herein. The DIO-LSA uses Diophantine Equations to calculate the inverse elements of groups and to determine when $c \cdot \epsilon \varphi(n) \equiv 1$ mod n, thus revealing the plaintext, which drastically reduces the steps the receiver needs to take to find the plaintext as described below. The DIO-LSA further uses permutation groups, in conjunction with LSA, to encrypt and decrypt symbols by using the indices that describe the order of the group, i.e., it encrypts the indices of each group element instead of the element itself, thereby increasing security by adding an additional φ(n)! possible group permutations to each potential U(n) used by the sender and receiver. Lastly, the DIO-LSA uses Gauss' Generalization of Wilson's Theorem to generate large key sets where each key in the set is many orders of magnitude larger than the original key, and the order of each set is arbitrarily large. This protocol allows each party to take a single key and use LSA to deterministically generate a large, unique, key for each character in the message providing the same effect of multiple keys exchanged without the prohibitive computation necessary for asymmetric exchanges of a similar length, all described further below.

A fundamental role for the information sharing is played by a mathematical theorem called Gauss' Generalization Of Wilson's Theorem. This theorem guarantees that, by operating the elements in a certain way, the parties that share information can expect to find common elements, congruent to 1 modulo n (for noncyclic groups) or −1 modulo n (for cyclic groups), to every group that can be used as a particular reference.

Use of the DIO-LSA is virtually unlimited in the field of cryptography since it allows multiple parties to share as little as one element at a time. This can be advantageous in fields like finance and banking where account and credit card information is exchanged, in the open, millions of times per day. For example, each ATM, ecommerce, and money wiring transaction would benefit from use of the DIO-LSA as it is less computationally intensive than current symmetric methods as smaller numbers are used to compute. For example, businesses that utilize online retail would benefit from the increased security and decrease energy demand. In addition, organizations such as governments and military organizations could benefit from increased security and decreased energy consumption in storing and sharing large amounts of classified information. Additionally, individuals that use current communication technology could benefit from increased security in phone calls, sms, mms, apps, emails, chats, far Edge computing, sharing of sensitive data like Social Security Numbers, and any symbolic documents, as well as encryption of personal codes and passwords.

The DIO-LSA can be utilized when two parties know a key, for example a number, and keep it secret. From the key, the parties independently generate the same integer, call it n, that will be used to generate and list the group U(n) and its elements. In the case that the group U(n) is used, the sender, after having listed and ordered in ascending order (or descending, as long as both parties agree) the elements of the group, choses a specific element, say m, which represents the plaintext. The sender multiplies all the elements from the smallest to m (included) and sends the product modulo n, call it c, publically to the receiver. The receiver reads c as ciphertext and, to decrypt, multiplies all the elements of the group in ascending order, checking each time that the receiver multiplies an element to the previous partial product, if the element generated is congruent to c modulo n. When the receiver finds an element congruent to c modulo n, the receiver knows that the last multiplied integer is m, then the receiver knows that m is the plaintext.

Since the group elements are closed under multiplication, then it is possible that during the process, the integer c is generated more than once. The sender records the number of times this happens, call it Σ, and sends the receiver the ordered pair (c, Σ) publically. Hence when the receiver has generated the element c, Σ+1 times, he knows that the last element multiplied is indeed m.

Additionally the DIO-LSA can be used pairing the Gauss' Generalization of Wilson's Theorem with the multiplication modulo n, while operating within the group U(n). According to Gauss's Generalization of Wilson's Theorem, if the group U(n) is cyclic, then all the elements of the group multiplied together will generate an element that is congruent to −1 modulo n. If the group is noncyclic, then the elements multiplied together generate an element congruent to 1 modulo n.

For example, where the group is noncyclic, n must be chosen so that the products of all the elements is congruent to 1 mod n. In this case, after the sender and the receiver have listed and ordered the group elements in ascending order (or descending, as long as the two parties agree beforehand), the sender chooses the plaintext m and sends the products modulo n (call it c) of all the elements of the group from the smallest to m (included). The multiplication of the elements might generate more than one element congruent to 1 modulo n. The sender will record all the instances that this happens, call it Σ. The sender will then send (c, Σ) publically to the receiver. Since the group is cyclic, the receiver knows that all of the elements multiplied together generates an element congruent to 1 modulo n. Then, the receiver multiplies the elements of the group, starting with the largest and multiplying in descending order, with c and checks to see if it's congruent to 1 modulo n each time. When the receiver finds elements congruent to 1 modulo, Σ+1 times, the receiver knows that all of the elements of the groups have been multiplied, so the next element of the list in descending order, yet to be multiplied, is the plaintext m. The concept of key exchange such as for example RSA or Diffie-Hellman key exchange method, may provide background for the present invention.

Example Using Noncyclic Groups

Suppose two parties want to secretly exchange information. This information should be considered symbolic by nature (e.g. numerically, alphabetically, etc.). It is customary in the field of cryptography, to assign names to the sender, receiver, and potential eavesdropper, as such we will choose Alice, Bob and Eve respectively. They perform the following steps:

1. Alice and Bob begin by sharing a secret number k>1 that is only known to Alice and Bob.
2. From k they generate an integer n such that, according to Gauss' Generalization of Wilson's Theorem, the product of all the integers less than n and coprime with n is congruent to 1 mod n. It is obvious that, just by multiplying k by any composite integer (with 4 being the first available, so n=4k) we can ensure to achieve this result. Thus, now in U(n) we have that $a_1 \cdot a_2 \cdot a_3 \cdots a_{\phi(n)} \equiv 1$ mod n.
3. At this point, Alice and Bob independently list the elements of U(n) in ascending order as U(n)=<∈$_1$, ∈$_2$, ∈$_3$, . . . , ∈$_h$, . . . , ∈$_{\phi(n)}$> where ∈$_i$<Σ$_j$ when i<j. Note that, since k is only known to Alice and Bob, and U(n) is chosen from the shared knowledge of k, then it must be the case that U(n) is only known to Alice and Bob.
4. Alice chooses an element of the group to represent the plain text of her message, call it ∈$_h$, to send to Bob.
5. To encrypt the plaintext, Alice multiplies together each element of the group up to ∈$_h$ modulo n in the following way: ∈$_1 \cdot$ ∈$_2 \cdots$ ∈$_h$ mod n≡c.
6. Now, for the fundamental properties of groups, since U(n) is a group, and because c is an element of the group, the inverse of c exists and it is unique. Call such an inverse element z then we have that c·z≡1 mod n. It follows that, for an integer r, $cz-1=rn \rightarrow cz-rn=1$. This means that Alice finds z by solving this Diophantine Equation for the unique positive value less than n.

7. Alice publicly sends z to Bob.
8. Bob receives z and multiplies z with the other elements of the group in ascending order and checks if $z \cdot \in_1 \equiv 1$ mod n, $z \cdot \in_1 \cdot \in_2 \equiv 1$ mod n, all the way until $z \cdot \in_1 \cdot \in_2 \cdots \in_h \equiv 1$ mod n, which will necessarily be congruent to 1 modulo n by Gauss's Generalization of Wilson's Theorem, since all the elements of the group have been multiplied (and because n in the desired form). At this point Bob knows that $\in_h$ is indeed the plaintext.

Since 1 is an element of the group and it is indeed the element congruent to 1 modulo n, then the multiplication of the elements of the group might generate 1 even in some cases where not all the elements of U(n) have been multiplied, unpredictably. Thus, before Alice sends the ciphertext z she performs $z \cdot \in_1 \equiv 1$ mod n, $z \cdot \in_1 \cdot \in_2 \equiv 1$ mod n, all the way to $Z, \in_1, \in_2 \cdots \in_h \equiv 1$ mod n and records the number of additional times she generates elements congruent to 1 modulo n, and calls this number $\Sigma$. Then she publicly sends the tuple $C=(z, \Sigma)$, which becomes the ciphertext.

When Bob receives $C=(z, \Sigma)$ he will start multiplying the elements in ascending order until he finds $\Sigma+1$ elements congruent to 1 modulo n, revealing the plaintext.

9. Alice will send another symbol of the plaintext by running the DIO-LSA from the very beginning, including the sharing of the integer k.

Example Using Cyclic Groups

Using the format of the example above, the following steps are performed:

1. Alice and Bob begin by sharing a secret number k>1 that is only known to Alice and Bob.
2. From k they generate an integer n such that, according to Gauss' Generalization of Wilson's Theorem, the product of all the integers less than n and coprime with n is congruent to $-1$ mod n. So, n is any positive integer power of an odd prime number, or twice as much. Thus, now in U(n) we have that $a_1 \cdot a_2 \cdot a_3 \cdots a_{\phi(n)} \equiv -1$ mod n.
3. At this point, Alice and Bob independently list the elements of U(n) in ascending order as $U(n) = <\in_1, \in_2, \in_3, \ldots, \in_h, \ldots, \in_{\phi(n)}>$ where $\in_i < \in_j$ when i<j. Note that, since k is only known to Alice and Bob, and U(n) is chosen from the shared knowledge of k, then it must be the case that U(n) is only known to Alice and Bob.
4. Alice chooses an element of the group to represent the plain text of her message, call it $\in_h$, to send to Bob.
5. To encrypt the plaintext, Alice multiplies together each element of the group up to $\in_h$ modulo n in the following way: $\in_1 \cdot \in_2 \cdots \in_h$ mod n≡c.
6. Now, for the fundamental properties of groups, since U(n) is a group, and because c is an element of the group, the inverse of c exists and it is unique. Call such an inverse element z then we have that $c \cdot z \equiv -1$ mod n. It follows that, for an integer r, $cz-1=rn \rightarrow cz-rn=-1$. This means that Alice finds z by solving this Diophantine Equation for the unique positive value less than n.

7. Alice publicly sends z to Bob.
8. Bob receives z and multiplies z with the other elements of the group in ascending order and checks if $z \cdot \in_1 \equiv -1$ mod n, $z \cdot \in_1 \cdot \in_2 \equiv -1$ mod n, all the way until $z \cdot \in_1 \cdot \in_2 \cdots \in_h \equiv 1$ mod n, which will necessarily be congruent to 1 modulo n by Gauss's Generalization of Wilson's Theorem, since all the elements of the group have been multiplied (and because n in the desired form). At this point Bob knows that $\in_h$ is indeed the plaintext.

Since $-1$ is an element of the group and it is indeed the element congruent to $-1$ modulo n, then the multiplication of the elements of the group might generate $-1$ even in some cases where not all the elements of U(n) have been multiplied, unpredictably. Thus, before Alice sends the ciphertext z she performs $z \cdot \in_1 \equiv 1$ mod n, $z \cdot \in_1 \cdot \in_2 \equiv -1$ mod n, all the way to $z \cdot \in_1 \cdot \in_2 \cdots \equiv -1$ mod n and records the number of additional times she generates elements congruent to $-1$ modulo n, and calls this number $\Sigma$. Then she publicly sends the tuple $C=(z, \Sigma)$, which becomes the ciphertext.

When Bob receives $C=(z, \Sigma)$ he will start multiplying the elements in ascending order until he finds $\Sigma+1$ elements congruent to 1 modulo n, revealing the plaintext.

9. Alice will send another symbol of the plaintext by running the DIO-LSA from the very beginning, including the sharing of the integer k.

Mapping Group Elements to the Set of Plaintext Symbols

A method for mapping elements from the group U(n) to the set of plaintext symbols P via a surjective function $\psi:U(n) \rightarrow P$ is provided. The function $\psi$ must be surjective for each member of the codomain to have a preimage in U(n) in order to make sure each plaintext character is paired with a member of the group. This can be done by mapping the group elements from U(n) to P. In cases where the order of P is less than the order U(n), the elements can be mapped modulo the order of P. For example: Assume P is the set of symbols {e, f, g}. Then $\psi$ maps the elements as follows:

e→1
f→2
g→4
e→5
f→7
g→8

Consider the above mentioned example where Alice wants to send the symbol f. She can send this with either $1 \cdot 2$ mod 9≡2 or $1 \cdot 2 \cdot 4 \cdot 5 \cdot 7$ mod 9≡1. So she can send f as either c=1 or c=2 as the first component of C.

Encrypting $\Sigma$ for Enhanced Security

The method can further comprise encrypting $\Sigma$ for enhanced security. Since the integer $\Sigma$ is sent publicly, Alice may wish to hide its value. One way this can be done is as follows:

1. Convert $\Sigma$ and k into binary and reduce the length of the binary string that represents to the exact length of the binary string that represents. For convenience we will call this new value where m is the part of the binary string that differs in length between the string and.
2. Alice then performs an XOR on $\Sigma 2$ and y2 to get a new value $\Sigma 2 \oplus y2 = x$.
3. Alice sends Bob $C=(z, x)$ publicly.
4. Additionally Alice can use a secure hash algorithm $H(x)$ on x. This will ensure that, if Eve attempts to alter the message by changing $\Sigma$, Bob and Alice will detect this by comparing hash values.
5. Alice sends Bob $C=(z, x, H(x))$ publicly.
6. Since Bob knows k from the initial key exchange, he performs $k2 \oplus x2$ ignoring the part of the string that is beyond the length of x2. This process yields $\Sigma$.

The DIO-LSA can be implemented in several ways that have varying degrees of security that come with different levels of computational complexity. The use of which will be determined by the needs of the sender/receiver. Three such possibilities are described.

1. Perform the desired key exchange once and encrypt the entire message in the same U(n).
2. Pick a value s∈ℤ and change k each time Σ is divisible by s. This will require extra computation depending on the value of s.
3. Change k for each al. This will require the most computation, but will prevent any more than one character of the encrypted message from being exposed in the event that the value of k is discovered by Eve.
4. In order to avoid giving any hint about the size of the group that can be guessed by the magnitude of Σ, the following procedure can be performed: Let Ω be the total number of elements congruent to 1 modulo n that are generated by multiplying all the elements of the group in ascending order. Then Alice (z, nΩ+Σ) to Ben. Since Bob knows all the elements of the group, then he can easily derive Ω by multiplying all the elements of the groups one by one and check their congruence modulo n all the time, and of consequence she can find Σ by performing nΩ+Σ→mod nΩ. This procedure allows the sender to publish a very large integer that substitutes Σ even working within a very small group.

Example

The DIO-LSA can be used to make the computations extremely fast while using large groups. The following example is provided which incorporates a small order, noncyclic group, making computations manageable. In other aspects, a cyclic group can be used. Consider that Alice and Bob share k=51003. Then, both list in ascending order the elements of U(51003·4)=U(204012)=⟨1, 5, 7, 11, 13, 17, 19, 23, 25, 29, 31, 35, 37, 41, 43, 47, . . . , 204011⟩, which contains 67968 elements. Now assume that Alice wants to send Bob the element '31', she performs 1·5·7·11·13·17·19·23·25·29·31 mod 204012=58787. Note that, if Alice sends 58787 to Bob, he must multiply 67957 elements together and check congruence to 1 modulo n each time to find the plaintext. This becomes increasingly cumbersome as the order of U(n) increases.

Alice knows that there exists an integer z such that 58787·z≡1 mod 204012. It follows that, for some r∈ℤ, 58787z−204012r=1. So z=77507.

Next Alice finds the value of Σ by performing:

$$77507 \cdot 5 \bmod 204012 \equiv 183523$$
$$183523 \cdot 7 \bmod 204012 \equiv 60589$$
$$60589 \cdot 11 \bmod 204012 \equiv 54443$$
$$54443 \cdot 13 \bmod 204012 \equiv 95723$$
$$95723 \cdot 17 \bmod 204012 \equiv 199207$$
$$199207 \cdot 19 \bmod 204012 \equiv 112717$$
$$112717 \cdot 23 \bmod 204012 \equiv 144347$$
$$144347 \cdot 25 \bmod 204012 \equiv 140471$$
$$140471 \cdot 29 \bmod 204012 \equiv 197431$$

Since no elements congruent to 1 mod 204012 have been generated, then Σ=0. She now sends Bob the ciphertext C=(77507, 0)

Bob receives C.

To decrypt, Bob multiplies the elements of the group in ascending order together with z, until he finds the first element congruent to 1 modulo 204012 (since Σ=0):

$$77507 \cdot 5 \bmod 204012 \equiv 183523$$
$$183523 \cdot 7 \bmod 204012 \equiv 60589$$
$$60589 \cdot 11 \bmod 204012 \equiv 54443$$
$$54443 \cdot 13 \bmod 204012 \equiv 95723$$
$$95723 \cdot 17 \bmod 204012 \equiv 199207$$
$$199207 \cdot 19 \bmod 204012 \equiv 112717$$
$$112717 \cdot 23 \bmod 204012 \equiv 144347$$
$$144347 \cdot 25 \bmod 204012 \equiv 140471$$
$$140471 \cdot 29 \bmod 204012 \equiv 197431$$
$$197431 \cdot 31 \bmod 204012 \equiv 1$$

Now Bob knows that the plaintext was the element '31'.

Permutations Replacing New k Values

For secret communication between parties with the only possibility of being equipped with a finite number of shared k's, the method can comprise group permutations.

Consider that Alice and Bob share a key k. Let n=tk where t is any composite integer greater than 2. Then, the group with the elements listed in ascending order is $$U(n) = \langle \epsilon_1, \epsilon_2, \epsilon_3, \ldots, \epsilon_{\phi(n)} \rangle.$$

Let S={1, 2, 3, . . . , Φ(n)} be the set of all of the indexes of the elements of the group U(n). And let $S_n$ be the set of all of the permutations of S. Then the elements of S are in the form $$a = \begin{bmatrix} 1 & 2 & \ldots & \phi(n) \\ a(1) & a(2) & \ldots & a(\phi(n)) \end{bmatrix}$$

Alice and Bob chose one of these permutations by performing a key exchange. Alice sends Bob the element $\epsilon_h$ to communicate the element $\epsilon_{a(n)}$. This gives trivially φ(n)! possible permutations which means φ(n)! possible pseudo groups.

Now, for $$\beta = \begin{bmatrix} 1 & 2 & \ldots & \phi(n) \\ \beta(1) & \beta(2) & \ldots & \beta(\phi(n)) \end{bmatrix},$$

any element $\epsilon_h$ sent by Alice, the plaintext would correspond to the element $\epsilon_{\beta(\phi(h))}$. Any different permutation, including $a^n$ for n∈ℤ, will exponentially increase the number of pseudo-groups that would substitute a group generated from a different k.

As a remark note that n vs φ(n) is linear. In the previous computational example note that φ(204012)=67968 which means that U(204012) has 67968 elements, which translates to 67968! Permutations. Consider Alice and Bob agree on using a combination of 5 different permutations of U(n). Call them γ, δ, ζ, θ, and κ. Then the elements shared secretly are in the form $\epsilon_{\gamma\delta\zeta\theta\kappa(i)}$. This means that, without knowing k or $S_n$, the eavesdropper has $$\frac{1}{(67968!)^5}$$

possibilities of guessing the right element.

Example of Permutations

Let k=4, the U(n)=(4·4)=U(16)=<1, 3, 5, 7, 9, 11, 13, 15> and let an arbitrary permutation of U(n) be $$a = \begin{bmatrix} 1 & 2 & 3 & 4 & 5 & 6 & 7 & 8 \\ 2 & 3 & 1 & 7 & 5 & 8 & 4 & 6 \end{bmatrix}.$$

Now suppose that Alice wants to send Bob '11', which is the sixth element. Instead of encrypting 11, Alice will encrypt the element that has the index α(6)=8, which is 15.

When Bob decrypts Alice's ciphertext, by finding the eighth element of the group, he will know, using the permutations a that the plaintext is indeed the sixth element, 11.

Large Key Generator for Key Expansion and Padding

The following uses DIO-LSA to generate keys of arbitrarily large sets of keys.

Assume n is only known to Alice and Bob. Alice sends Bob $\in_h \in U(n)$ via DIO-LSA, where the groups can be cyclic or noncyclic as described above. Then each perform the canonical multiplication of each element of the group up to $\in_h: \in_1 \cdot \in_2 \cdots \in_h = M$.

Example

Alice and Bob share a secret key n=10082 (which has a length of 5 digits). First, they list the elements of U(10082) of which there are 4970. Then Alice chooses the 500th element of the orders list. Bob runs the DIO-LSA to find the element. Then both multiply the first 500 elements to generate $M_1$ and the next 4470 elements to generate $M_2$. finally the combine $M_1$ and $M_2$ and obtain a new key with an enhanced length of 17740 digits.

The security of the DIO-LSA is derived from the fact that only Alice and Bob know k. It follows that Eve cannot calculate U(n). And, with infinite possible U(n)'s (which yields infinite possible elements to choose from), he cannot decrypt the publicly sent C=(c,Σ).

In some aspects, when choosing a group U(n), n not be prime or else the product of the group elements may be a factorial and thus easily recognizable by a cryptanalyst. This can be easily ensured by setting t>1.

While the invention has been described with reference to certain particular aspects thereof, those skilled in the art will appreciate that various modifications may be made without departing from the spirit and scope of the invention.

We claim:

1. A computer-implemented method for two parties to secretly exchange information, the method comprising:
   a) the two parties each party with their own processor sharing a secret number k, k>1 and is only known by the two parties;
   b) generating, by the processors, an integer n from k such that, the product of all the integers less than n and coprime with n is congruent to 1 mod n, wherein U(n) comprises $a_1 \cdot a_2 \cdot a \cdots a_{\phi(n)}$ each party independently listing the elements of U(n) in ascending order as U(n)=<$\epsilon_1, \epsilon_2, \epsilon_3, \ldots, \epsilon_h, \epsilon_j, \ldots, \epsilon_{\phi(n)}$> wherein $\epsilon_i < \epsilon_j$ when i<j;
   c) one party choosing an element from U(n) to represent a plaintext of a selection of data;
   d) the one party finds z by solving the Diophantine Equation for the unique positive value less than n, wherein the solving entails encrypting, by the processor, the selection of data by multiplying together each element of the group up to En modulo n in the following way: $\epsilon_1 \cdot \epsilon_2 \cdot \epsilon_3 \cdots \epsilon_h$ mod n≡c, and generating a ciphertext, tuple C=(z, Σ), wherein z is calculated by solving the Diophantine Equation for the unique positive value less than n, where the Diophantine Equation comprises c·z≡1 mod n, where such an inverse element is z, and wherein, for an integer r, cz−1=rn→cz−rn=1, and wherein Σ is the number of instances that, multiplying the elements of U(n) in ascending order with z generates congruency to 1 modulo n; and
   e) the one party sends the ciphertext, tuple C=(z, Σ), to the second party over a network or stores the ciphertext, tuple C(z, Σ) in a memory.

2. The method of claim 1, further comprising decrypting the encrypted data, wherein the decrypting comprises: receiving, by the processor of the second party, C=(z, Σ) and multiplying z with the elements in ascending order until Σ+1 elements congruent to 1 modulo n, is found, revealing the plaintext.

3. The method as recited in claim 1, wherein the secret number k is generated by one of the two processors or selected by a user.

4. The method as recited in claim 1, wherein the computer-implemented method is performed on an electronic device is selected from the group consisting of: a desktop computer; a laptop computer; a smartphone; a tablet computer; and an automated teller machine.

5. A method of enhancing keys comprising: the method of claim 1, further comprising, by a processor, canonical multiplying each element of the group up to the plaintext h as h: $\epsilon 1 \cdot \epsilon 2 \cdots \epsilon h = M$, where M comprises the enhanced key.

6. The method as recited in claim 1, wherein a party comprises a system having at least one processor and at least one memory.

* * * * *